Oct. 27, 1959     A. C. PETERSON     2,910,146
FLUID BRAKE MEANS FOR VEHICLES
Filed Sept. 6, 1956     2 Sheets-Sheet 1
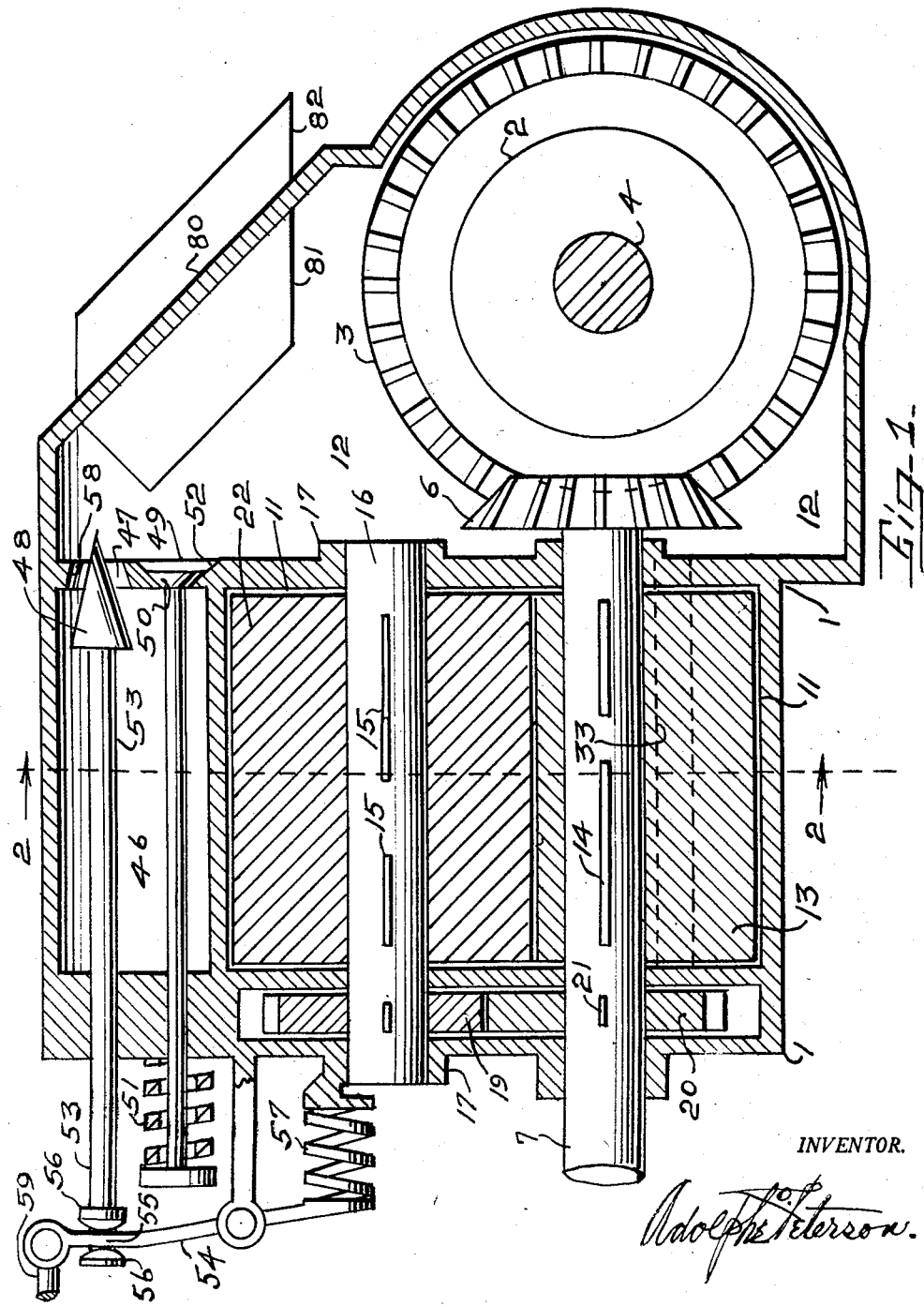
INVENTOR.
Adolph C. Peterson.

Oct. 27, 1959  A. C. PETERSON  2,910,146
FLUID BRAKE MEANS FOR VEHICLES
Filed Sept. 6, 1956  2 Sheets-Sheet 2
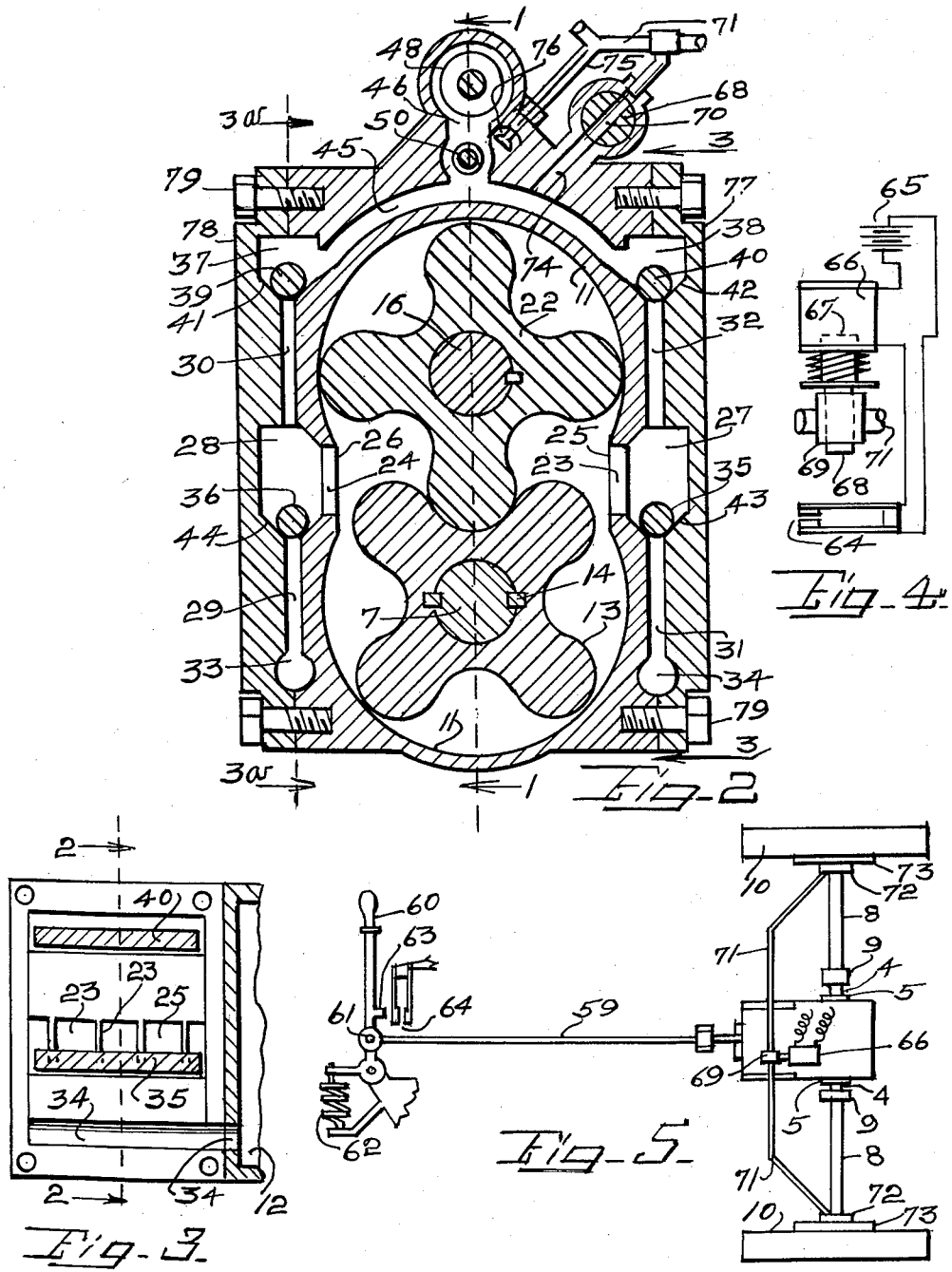
INVENTOR.
Adolphe C. Peterson United States Patent Office 2,910,146
Patented Oct. 27, 1959

2,910,146

FLUID BRAKE MEANS FOR VEHICLES

Adolphe C. Peterson, Minneapolis, Minn.

Application September 6, 1956, Serial No. 608,405

5 Claims. (Cl. 188—92)

My invention relates to braking means for vehicles, which employs a fluid to effect braking, and it is therefore called "fluid brake means for vehicles."

The principal objects of my invention are to provide a form of braking means which employs a fluid to effect braking and which therefore has advantages in the use of the braking means resulting from reduced wear in use, improved reliability in use, less cost in the manufacture of the means, and in general more effective braking means due to its improved reliability and freedom from the difficulties ordinarily present in the commonly used forms of vehicle braking means. An object is the provision of a means for braking which may be used indefinitely for braking in long descents of hills, for instance, without any appreciable wear in the mechanism of the braking means. An object is the provision of a means for braking which has two ranges, generally in its operation, one range which may be used in most braking operations and due to the use of fluid in such range, sustains substantially no wear in that range; and a second range which includes not only the use of the fluid means for continued braking but which supplements that fluid braking by supplemental automatic braking with friction braking surfaces, so that such increased braking effect is effective for emergency or quick braking effect. An object is the provision of a means or system of braking which inherently provides, not only the fluid braking means, but also effective power application for a supplemental frictional braking means such as is commonly used in vehicles. In general the object is improvement of construction and efficiency of vehicle braking means, and means for the control of such braking means.

The principal devices and combinations of devices, comprising my invention, are as hereinafter described and as defined in the claims. In the accompanying drawings, which illustrate my invention, like parts are referred to by like characters in so far as practicable. Referring to the drawings:

Figure 1 is a view chiefly in vertical section through the axes of the principal operating elements of my brake means, some parts being in full side elevation, the section being on the line 1—1 of Figure 2, some parts being broken away.

Figure 2 is a vertical section, at right angles to the plane of the section of Figure 1, the section of Figure 2 being on the lines 2—2 of Figures 1 and 3, some parts being broken away.

Figure 3 is a view looking from the right side of Figure 1, with the right valve cover removed, to show the face of the transmission casing adjacent the valve cover when replaced, and showing the pair of long cylindrical valves in vertical section on the line 3—3 of Figure 2, an adjacent part of the transmission-differential casing, being in vertical cross section on the line 3—3, Figure 2, on one-half scale.

Figure 4 is a detail illustration showing the circuit of the electrical control for the supplemental friction braking means, in connection with an illustration of the solenoid valve operating means and the valve operated thereby for controlling the flow of fluid to the supplemental frictional braking means.

Figure 5 is an illustration, in diagrammatic manner, on a very much reduced scale, showing the application of my braking means to the rear pair of wheels of an automobile, showing in connection a control lever means and the connection therewith of the electric control means and fluid control means for the fluid braking.

A section on line 3a—3a Figure 2 would be similar to Figure 3.

The chief elements of my device are incorporated in a so-called differential transmission casing, this being generally designated 1, and which includes therein the usual differential gear casing 2, the large bevel gear 3 mounted on the or with the differential gear casing 2, the customary side shafts 4 which are rotatably mounted in bearings 5 (Figure 5) in the differential transmission casing, the smaller bevel gear 6 which is rotatable conjointly with the propeller shaft 7, being fixed therewith, the propeller shaft 7 being the usual longitudinally placed propeller shaft which drives from any engine means directly by the propeller shaft 7 or by means of universal joints (not shown), as is customary with transmission propeller shaft means in automobiles. The side shafts 4 drive the extensions 8, there being universal joints 9 interposed in these shafts, and through these shafts the drive is transmitted to the automotive vehicle rear wheels 10, as customary with such vehicles. It is contemplated in this case, that the differential-transmission casing 1, will be mounted in any means in a vehicle, so that the casing 1 is carried by the vehicle frame, substantially rigidly therewith, but such mounting is not shown, and it is contemplated that the casing 1 may be mounted in any manner, as for instance, in the manner of the mounting commonly known of such casings with the rear axle means of the rigid type rather than the divided swung type. The mounting of the rear wheels is not particularly shown, since such means is commonly known, and any such means may be used in connection with this braking means.

A pump chamber 11 is formed in the differential-transmission casing 1, so as to be isolated from the differential chamber 12, except as hereinafter described, and in the chamber 11 there are rotatably mounted two lobed type pump elements, which are rotatable in lobed inter-operation, as such pump means usually are formed, one lobe element 13 being fixed, by means of tongue and groove means or other securing means designated 14, to be operative with the propeller shaft 7 in rotation of the latter, and the other of which is fixed, by means of tongue groove elements or means 15 on a shaft 16, to be operative with the latter in rotation. The shaft 16 is rotatably mounted in bearings 17, and has fixed thereon, by tongue and groove means 18, or by other means, a spur gear 19 which is in cooperation with another spur gear 20, of like size, which is fixed, by tongue and groove means 21, or otherwise, on the propeller shaft 7 to be operated therewith. The spur gears 19, 20, ensure that the lobed element 13 will rotate at exactly the same speed as the second lobed element, which is designated 22, and that the lobed elements 13, 22, will be operated in such cooperation, that there will be no mechanical interference in rotation. The spur gears 19, 20, may be eliminated in any construction, where the lobed elements 13, 22, may have such a larger number of lobes, so that freedom from mechanical interference in rotation, is inherently obtainable. The lobed elements may thus be more in the nature of spur gears, and may themselves be spur gears, placed in the chamber 11 and operating as the lobed elements 13, 22, operate, to perform the pumping function, it being noted, that in any construction, the pump elements 13, 22, of any form, should be of such size and the pump means of such capacity that it will adequately provide the braking function, as hereinafter described.

The pump means, as formed by the pump elements 13, 22, may have either fluid induction or fluid expulsion, at either side by means of ports 23 and 24, respectively, these ports being formed between vertical grid elements 25, 26, which form support between the upper and lower parts of the transmission casing 1, at the location of the pump chamber of the casing. The ports 23, 24 provide communication with the valve chambers 27, 28, through either of which there may be induction or expulsion of fluid, and the valve chambers 28, 27 are connected or in communication, respectively, with the pair of conduits 29, 30 and 31, 32, one pair serving one valve chamber, and the other pair serving the other valve chamber. One conduit 29 of one pair communicates by conduit 33 with the differential casing chamber 12, and the conduit 31 of the other pair also communicates by a conduit 34 with differential casing chamber 12, so that thus either valve chamber 27 or 28 may draw fluid from the differential casing chamber 12 by means of the conduit 29 or 31, according to the pumping operation (forward or reverse drive), and there is interposed in either suction conduit, one valve 35, or 36, the latter valves being non-return valves, preventing return flow, and each valve having the form of a cylindrical shape, long and narrow in transverse section. The conduits 30 and 32, respectively, permit expulsion of fluid upwardly from the valve chambers 28, 27, to valve chambers 37, 38, respectively, valves 39, 40, being interposed, these valves normally seating on the valve seats 41, 42, respectively, and each being substantially of the same shape as the other valves 35, 36. The valves 35, 36 seat on valve seats 43, 44, respectively.

The valve chambers 37, 38 each discharge through the common conduit 45 to the common control chamber 46, and the latter may discharge by either a comparatively large port 47, as controlled by main control valve 48, or through a smaller safety valve port 49, as controlled by a safety valve 50, the latter being yieldably seated by a coil spring 51, the latter being of such calibration or strength, that it will normally hold valve 50 against its seat 52 and will not open from the seat unless there is a pressure in the control chamber 46 above a safe pressure or a permissible operative pressure for braking, this pressure being anything, according to the construction, from say five hundred pounds to one thousand pounds, more or less.

The main control valve 48 by its stem 53, is controlled by a lever 54 which latter is bifurcated at 55 about the stem 53 and is located between collars 56 on stem 53, so that movement of lever 54, either way will cause similar movement of the stem 53 and its valve 48, the yieldable coil spring 57 normally causing the valve 48 to seat on its seat 58, the rod or cable 59 providing means for manual control of the lever 54 and thus of valve 48, for initiation of braking by the fluid means or cessation of that braking.

The cable 59 provides interconnection between lever 54 and a manual lever 60, the latter being any type of lever such as hand lever or foot lever or pedal, the manual lever 60 is pivotally mounted at 61, and is yieldably moved one way by a large coil spring 62, the direction of this movement by coil spring 62, which is under relatively strong tension, being such as to permit closing of main control valve 48 by its associated spring 57, except when the manual lever 60 is manually moved against the spring 62 to cause the main control valve 48 to be moved, closing on its seat to thereby close the port 47 between control chamber 46 and the differential casing chamber 12, so as thereby to cause pressure of fluid to be raised in control chamber 46, as hereinafter further described. The spring 62 should be of such large size and capacity, that it has a greater force to open valve 48, than the spring 57 has to move it the other way. The association of the levers may be in any manner to permit control by the manual lever of the valve 48.

The manual lever 60, by a lug 63, in extreme movement of the manual lever 60, manually, in braking movement, will contact spring contacts 64 to close contact between the springs 64 and thus close a control electric circuit, as shown in Figure 4. By this circuit current may pass from battery 65 to solenoid coil 66 to cause electromagnetic pull to be exerted on armature 67 which has attached valve 68, the latter being thereby pulled in its valve casing 69 to open the passage 70 to conduit 71 to the hydraulic brake application means 72 of the friction brake units 73, one on each wheel 10, so that thus fluid pressure in control chamber 46 will become effective in the application means 72. The conduit 71 by means of the passage 70 in valve 68 may be connected with the passage 74 to the conduit 45 and valve chambers 37, 38, so that when the valve 68 is opened or pulled by solenoid 66, the pressure effective in the valve chambers is effective in the brake application means 72. The pressure of fluid in conduit 71 and the brake application means 72 may be relieved by flow of fluid back to the control chamber 46 through a by-pass pipe 75 which has a non-return valve 76 therein to prevent flow through the by-pass to the application means 72, by way of conduit 71. The non-return valve 76 may be any type of non-return or check valve, such as will permit free-flow from the conduit 71 by way of pipe 75, to common control chamber 46, when there is low pressure in chamber 46, but will block flow through by-pass pipe 75 to conduit 71 from chamber 46.

The valve chambers which have been described and in which the valves 35, 36, 39, 40 are placed are formed between the cover-plates 77, 78, and the adjacent faces of the transmission casing 1, and these cover-plates 77, 78 are secured to the transmission casing by the screws or bolts 79, the valves being placed in position before securing the cover-plates. The valves will seat by gravity when there is no flow of fluid by any valve. It may be noted that any type of spring means, such as is commonly employed to seat valves may be used, in any construction, if that be desired. Grids 25—26 retain the valves.

The transmission differential chamber 12 has placed in its wall 80, or formed therewith, fins 81 on the interior side, and fins 82, on the exterior side, these fins providing for some cooling of the braking fluid which may flow upon the interior fins 81 in circulation of the braking fluid by means of the ports in which are the control valves. This cooling means is shown as illustrative of any type of cooling means which may be provided by any commonly known means for cooling the braking fluid. The braking fluid may be any type of fluid as air or liquid, but that fluid is preferably a liquid lubricating fluid of low viscosity and high lubricating value.

The general operation and use of my braking means is now described. The propeller shaft 7 will be driven by any engine means such as used in an automotive vehicle, and when such means is propelling the vehicle, the main control valve 48 is lifted from its seat by the pull of the coil spring 62 against the levers 60, 54, and this open condition is maintained during propulsion of the vehicle. When the operator of the vehicle desires to brake the vehicle, he moves manual lever 60 to overcome the pull of the coil spring 62 and to permit the cable 59 to be released so that the coil spring 57 may close the main control valve 48 or partially close it upon its seat, and to the degree that the port associated with control valve 48 is closed, the flow of fluid through the port 47 is diminished or entirely prevented, and in this condition of control, the pump means 13, 22, being constantly rotated by propeller shaft 7 will pump fluid from one valve chamber 27 or 28 and force the fluid to either one of the valve chambers 37 or 38 and thereby, the pressure of fluid increases in control chamber 46 until a pressure approximating the pressure as controlled by the safety valve 50 is reached, and thereupon the safety valve opens from its seat and permits some flow through the port 49 so that that pressure is not exceeded. Attainment of the safety valve controlled pressure results in exertion of maximum braking effect effected by the pumping force required to move the fluid against that pressure and when such pressure is effective maximum fluid braking effect is reached. There may be lesser effective braking when the main control valve 48 is not completely closed, but only partially closed. Suppose now, the operator desires still greater effective braking, or quick emergency braking, he then continues movement of the manual lever 60 so as to close the contacts 64 and thereupon a current flows by means of these contacts 64 to the solenoid 66 to cause pull of valve 68 and opening of passage 70 to the conduit 71, and fluid under pressure will then flow from conduit 45 to conduit 71 and to brake application means 72 so that the friction brakes 73 on wheels 10 are then applied, in the manner such friction brakes are commonly applied in motor vehicles, so that this friction braking then is added to the fluid braking effect to quickly stop the movement of the vehicle.

When the operator desires release of the braking effect or cessation thereof, he releases manual lever 60 so that the coil spring 62, which is stronger than coil spring 57, overcomes the latter and pulls the main control valve 48 from its seat to completely open position. Thereupon pressure in control chamber 46 falls to near zero by release of fluid to differential casing chamber 12 and fluid pressure in conduit 71 is released by flow of fluid backwardly through by-pass 75 to conduit 45. In operation without braking effect the flow of fluid is unrestricted and the pressure is no higher than required for mere lubrication flow of the lubricating liquid, although it will be in considerable quantity, according to the predetermined proportions of the device. It should be noted that the valve 68 is shown in the open position, in Figure 2, that is, as if it had been pulled to that open position by the solenoid 66, but this showing of that valve, is without reference to the positions of parts, as shown in Figure 1, as the showing of valve 68 and its port 70, is for the sake of illustration of the port 70. In Figure 1, the control valves 48 and 50 are shown in the positions which they occupy, when the braking means is in the inactive, or unapplied condition, without braking effect. The valve 68 would not take the position to open port 70, unless the valve 48 is first moved to its closed position, for the initiation of braking effect.

The members 13 and 22 are described as lobed elements, and it may be observed, that the use of this term lobed element or lobed elements, is contemplated to include, in its such designation, any type of lobed cooperative elements, such as spur gears, lobed means such as in Rootes blowers, or even vane pump means, where any such means would adequately perform the pumping function for the increase of pressure of the fluid, as pumped. In reverse operation, as in backing of an automotive vehicle, the pump elements would pump the fluid in the reverse direction, as between chambers 27 and 28, the valve elements controlling the flow, then functioning in a reverse order.

While I have shown particular devices and combinations of devices, in the illustration of my invention, I contemplate that other detailed devices, especially in substitution for the pumping means shown, and any other type of valve means capable of performing the functions described, and other detailed combinations of devices, may be used in the realization of my invention, without departing from the spirit and contemplation thereof. The pumping means is shown, as a simple means, includable in the device, although I contemplate that the pumping means may be any type of pumping means, commonly used, such as reciprocable piston elements actuated by the propeller shaft.

What I claim is:

1. In vehicle braking means: a casing having formed therein a pump chamber; a propulsion shaft for driving by an associated engine, the said propulsion shaft having bearing mounting in said casing; a pair of lobed elements located in said pump chamber, one fixed on said propulsion shaft to be driven thereby, the other in inter-operation therewith and mounted in bearings in said casing, the lobed elements forming a pump means; the said casing being formed to have two portage chambers either one of which may be either an ingress or egress chamber, and to have casing walls closely adjacent each of said lobed elements to substantially seal each said portage chamber from the other; the casing wall parallel to one side of the lobed elements and their axes having a pair of valve ports, a lower one of which is an ingress valve port and an upper one of which is an egress valve port; the said casing wall parallel to the opposite side of the lobed elements and their axes having a pair of valve ports, a lower one of which is an ingress port and an upper one of which is an egress port; each valve port of each said pair of valve ports having a valve normally seating thereon and lifting therefrom for passage of fluid; a reservoir for liquid fluid; each of said lower valve ports providing for passage of liquid fluid from said reservoir to one of said portage chambers; each of said upper valve ports providing for passage of liquid fluid from one of said portage chambers and to a common control passage formed adjacent said casing chamber to pass liquid fluid from said upper valve ports to said reservoir; control means associated with said common control passage for restriction of passage therethrough to effect brake force on said propulsion shaft; the said casing walls parallel to said axes and oppositely of said lobed elements having valve cavities formed between adjacent faces of the casing wall and individual attached cover plates one on each opposite side of said casing and parallel to said axes.

2. In vehicle braking means: a casing having formed therein a differential chamber and adjacent thereto a pump chamber; a propulsion shaft for driving by an associated engine, the said propulsion shaft having bearing mounting in said casing and having at one end thereof a bevel gear which is located in said differential chamber; a differential unit located in said differential chamber and mounted in bearings in said casing to drive individual wheel shafts mounted in bearings in said casing; a bevel gear mounted on said differential unit and in driving inter-engagement with the first named bevel gear to transmit drive therefrom to said wheel shafts through said differential unit; a pair of lobed elements located in said pump chamber, one fixed on said propulsion shaft to be driven thereby, the other in inter-operation therewith and mounted in bearings in said casing, the lobed elements forming a pump means; the said casing being formed to have two portage chambers either one of which may be either an ingress or egress chamber, and to have casing walls closely adjacent each of said lobed elements to substantially seal each said portage chamber from the other; the casing wall parallel to one side of the lobed elements and their axes having a pair of valve ports, a lower one of which is an ingress valve port and an upper one of which is an egress valve port; the said casing wall parallel to the opposite side of the lobed elements and their axes having a pair of valve ports, a lower one of which is an ingress port and an upper one of which is an egress port; each valve port of each of said pair of valve ports having a valve normally seating thereon and lifting therefrom for passage of fluid; each of said lower valve ports providing for passage of liquid fluid from said differential chamber to one of said portage chambers; each of said upper valve ports providing for passage of liquid fluid from one of said portage chambers and to a common control passage formed adjacent said casing chambers to pass liquid fluid from said upper valve ports to said differential chamber; control means for said common control passage for restriction of passage therethrough to effect brake force on said propulsion shaft; the said casing walls parallel to said axes and oppositely of said lobed elements having valve cavities formed between adjacent faces of the casing wall and individual attached cover plates one on each opposite side of said casing and parallel to said axes.

3. In vehicle braking means: a casing having formed therein a differential chamber and adjacent thereto a pump chamber; a propulsion shaft for driving by an associated engine, the said propulsion shaft having bearing mounting in said casing and having at one end thereof a bevel gear which is located in said differential chamber; a differential unit located in said differential chamber and mounted in bearings in said casing to drive individual wheel shafts mounted in bearings in said casing; a bevel gear mounted on said differential unit and in driving inter-engagement with the first named bevel gear to transmit drive therefrom to said wheel shafts through said differential unit; a pair of lobed elements located in said pump chamber, one fixed on said propulsion shaft to be driven thereby, the other in inter-operation therewith and mounted in bearings in said casing, the lobed elements forming a pump means; the said casing being formed to have two portage chambers either one of which may be either an ingress or egress chamber, and to have casing walls closely adjacent each of said lobed elements to substantially seal each said portage chamber from the other; the casing wall parallel to one side of the lobed elements and their axes having a pair of valve ports, a lower one of which is an ingress port and an upper one of which is an egress valve port; the said casing wall parallel to the opposite side of the lobed elements and their axes having a pair of valve ports, a lower one of which is an ingress port and an upper one of which is an egress port; each valve port of each said pair of valve ports having a downwardly seated valve normally seating thereon and lifting therefrom for passage of fluid; a reservoir for liquid fluid; each of said lower valve ports providing for passage of liquid fluid from said reservoir to one of said portage chambers; each of said upper valve ports providing for passage of liquid fluid from one of said portage chambers and to a common control passage formed adjacent said casing chambers to pass liquid fluid from said upper valve ports to said reservoir; control means associated with said common control passage for restriction of passage therethrough to effect brake force on said propulsion shaft; the said casing walls parallel to said axes and oppositely of said lobed elements having valve cavities formed between adjacent faces of the casing wall and individual attached cover plates one on each opposite side of said casing and parallel to said axes.

4. In vehicle braking means: a casing having formed therein a differential chamber and adjacent thereto a pump chamber; a propulsion shaft for driving by an associated engine, the said propulsion shaft having bearing mounting in said casing and having at one end thereof a bevel gear which is located in said differential chamber; a differential unit located in said differential chamber and mounted in bearings in said casing to drive individual wheel shafts mounted in bearings in said casing; a bevel gear mounted on said differential unit and in driving inter-engagement with the first named bevel gear to transmit drive therefrom to said wheel shafts through said differential unit; a pair of lobed elements located in said pump chamber, one fixed on said propulsion shaft to be driven thereby, the other in inter-operation therewith and mounted in bearings in said casing, the lobed elements forming a pump means; the said casing being formed to have two portage chambers either one of which may be either an ingress or egress chamber, and to have casing walls closely adjacent each of said lobed elements to substantially seal each said portage chamber from the other; the casing wall parallel to one side of the lobed elements and their axes having a pair of valve ports, a lower one of which is an ingress port and an upper one of which is an egress valve port; the said casing wall parallel to the opposite side of the lobed elements and their axes having a pair of valve ports, a lower one of which is an ingress port and an upper one of which is an egress port; each valve port of each said pair of valve ports having a downwardly seated valve normally seating thereon and lifting therefrom for passage of fluid; a reservoir for liquid fluid; each of said lower valve ports providing for passage of liquid fluid from said reservoir to one of said portage chambers; each of said upper valve ports providing for passage of liquid fluid from one of said portage chambers and to a common control passage formed adjacent said casing chambers to pass liquid fluid from said upper valve ports to said reservoir; control means associated with said common control passage for restriction of passage therethrough to effect brake force on said propulsion shaft; the said casing walls parallel to said axes and oppositely of said lobed elements having valve cavities formed between adjacent faces of the casing wall and individual attached cover plates one on each opposite side of said casing and parallel to said axes; the said valves being located in said cavities and being each a cylindrical elongated element.

5. In vehicle braking means: a casing having formed therein a differential chamber and adjacent thereto a pump chamber; a propulsion shaft for driving by an associated engine, the said propulsion shaft having bearing mounting in said casing and having at one end thereof a bevel gear which is located in said differential chamber; a differential unit located in said differential chamber and mounted in bearings in said casing to drive individual wheel shafts mounted in bearings in said casing; a bevel gear mounted on said differential unit and in driving inter-engagement with the first named bevel gear to transmit drive therefrom to said wheel shafts through said differential unit; a pair of lobed elements located in said pump chamber, one fixed on said propulsion shaft to be driven thereby, the other in inter-operation therewith and mounted in bearings in said casing, the lobed elements forming a pump means; the said casing being formed to have two portage chambers either one of which may be either an ingress or egress chamber, and to have casing walls closely adjacent each of said lobed elements to substantially seal each said portage chamber from the other; the casing wall parallel to one side of the lobed elements and their axes having a pair of valve ports, a lower one of which is an ingress valve port and an upper one of which is an egress valve port; the said casing wall parallel to the opposite side of the lobed elements and their axes having a pair of valve ports, a lower one of which is an ingress port and an upper one of which is an egress port; each valve port of each said pair of valve ports having a downwardly seated valve normally seating thereon and lifting therefrom for passage of fluid; each of said lower valve ports providing for passage of liquid fluid from said differential chamber to one of said portage chambers; each of said upper valve ports providing for passage of liquid fluid from one of said portage chambers and to a common control passage formed adjacent said casing chambers to pass liquid fluid from said upper valve ports to said differential chamber; control means for said common control passage for restriction of passage therethrough to effect brake force on said propulsion shaft; the said casing walls parallel to said axes and oppositely of said lobed elements having valve cavities formed between adjacent faces of the casing wall and individual attached cover plates one on each opposite side of said casing parallel to said axes; the said valves being each a cylindrical elongated element and being located one in each said cavity.

References Cited in the file of this patent

UNITED STATES PATENTS

| | | | |
|---|---|---|---|
| 1,694,020 | Price | Dec. 4, | 1928 |
| 1,779,639 | Price | Oct. 28, | 1930 |
| 1,821,178 | Fisher | Sept. 1, | 1931 |
| 1,891,793 | Kauffman | Dec. 20, | 1932 |
| 1,987,273 | Strigl | Jan. 8, | 1935 |
| 2,001,585 | Roeder | May 14, | 1935 |
| 2,152,570 | Scates | Mar. 28, | 1939 |
| 2,406,304 | Levy | Aug. 20, | 1946 |

FOREIGN PATENTS

| | | | |
|---|---|---|---|
| 22,369 | Great Britain | Oct. 1, | 1912 |
| 289,229 | Switzerland | June 16, | 1953 |